(12) United States Patent
Suzuki et al.

(10) Patent No.: US 6,565,246 B2
(45) Date of Patent: May 20, 2003

(54) VEHICULAR HEADLAMP AND VEHICLE PROVIDED WITH SAME

(75) Inventors: Yasufumi Suzuki, Isehara (JP); Hirokazu Yoneyama, Isehara (JP); Takayuki Kawamura, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 09/727,550

(22) Filed: Dec. 4, 2000

(65) Prior Publication Data

US 2001/0000448 A1 Apr. 26, 2001

(30) Foreign Application Priority Data

Mar. 12, 1999 (JP) ............................. 11-345010
Mar. 12, 1999 (JP) ............................. 11-345013

(51) Int. Cl.⁷ ............................. F21V 17/02; B60Q 1/08
(52) U.S. Cl. ........................ 362/514; 362/283; 362/465
(58) Field of Search ................................. 362/514, 277, 362/319, 43, 283, 516, 520, 512, 517, 518, 346, 465, 322, 324

(56) References Cited

U.S. PATENT DOCUMENTS

| | | | |
|---|---|---|---|
| 5,060,120 A | 10/1991 | Kobayashi et al. | ........... 362/61 |
| 5,599,085 A * | 2/1997 | Tabata et al. | ................ 362/514 |
| 5,711,590 A * | 1/1998 | Gotoh et al. | ................... 362/43 |
| 6,059,435 A * | 5/2000 | Hamm et al. | ................ 362/514 |

FOREIGN PATENT DOCUMENTS

| | | |
|---|---|---|
| JP | 5-23216 | 4/1993 |
| JP | 7-195974 | 8/1995 |
| JP | 8-183385 | 7/1996 |
| JP | 11-78675 | 3/1999 |

\* cited by examiner

*Primary Examiner*—Sandra O'Shea
*Assistant Examiner*—Bao Truong
(74) *Attorney, Agent, or Firm*—Foley & Lardner

(57) ABSTRACT

A vehicular head lamp enables rotation of an upper reflector (1) relative to an intermediate reflector (2), thereby changing a dispersed light-distribution pattern (WP) with respect to a fixed reference light-distribution pattern (LP and HP). By causing a lower reflector (3) to rotate relative to the intermediate reflector (2), a collimated light-distribution pattern (SP) is changed with respect to the reference light-distribution patterns (LP and HP). The result of this arrangement is an improvement in visibility when the vehicle negotiates a curve.

17 Claims, 16 Drawing Sheets

VEHICULAR HEADLAMP AND VEHICLE PROVIDED WITH SAME

BACKGROUND OF THE INVENTION

1. Field of the Invention

The present invention relates to a vehicular headlamp for a vehicle which changes the pattern and range of illumination in response to the turning angle of the vehicle, and to a vehicle provided with a vehicular headlamp. More particularly, it relates to a headlamp capable of either independently or simultaneously changing a dispersed light pattern or collimated light pattern with respect to a fixed light pattern, resulting in an improvement in visibility in a curve, and to a vehicle incorporating such a headlamp.

2. Related Art

It is first noted that as used herein and in the accompanying drawings, the symbols L and R refer to the left side and right side, respectively, as seen by a front-facing driver, and the symbols U and D refer to the upward and downward directions, respectively, as seen from a front-facing driver.

The symbol Z-Z refers to a light axis, and so far as applicable, concurrently represents a reference plane that contains both the light axis and a vehicle-transversely level line crossing the light axis, the symbols HL-HR and HL-HR refer to a horizontal axis horizontal to the light axis Z-Z or a horizontal axis horizontal to a light-distribution axis, and the symbol VU-VD refers to a vertical axis vertical to the light axis Z-Z or a vertical axis vertical to a light-distribution axis.

This type of vehicular headlamp generally has a light-source bulb, a movable reflector, and a drive means for causing rotation of the movable reflector, the drive means causing rotation of the movable reflector so as to cause a change in the illumination direction from the light-source bulb and the range of illumination thereof. Such a vehicular headlamp is noted, for example, in Japanese Patent Publication No. 5-23216, and Japanese Patent Application Laid-Open Publications No. 8-183385 and No. 11-78675.

In a vehicular headlamp of the past as noted above, all that is done is that part of the light-distribution pattern is changed.

SUMMARY OF THE INVENTION

It is an object of the present invention to provide a headlamp for a vehicle capable of individually or simultaneously changing the dispersed light-distribution pattern and/or collimated light-distribution pattern with respect to a fixed reference pattern, resulting in an improvement in visibility in a curve.

The present invention provides a vehicular head lamp comprising a reflector comprising an effective reflective surface with an unchangeable outer shape, the effective reflective surface comprising a first reflective surface and a second reflective surface surrounded by the first reflective surface, wherein the second reflective surface is movable relative the first reflective surface, and a light-source bulb disposed on a light axis of the first reflective surface.

Accordingly, the above-noted object can be achieved.

The effective reflective surface may preferably further comprise a third reflective surface surrounded by the first reflective surface, the third reflective surface being movable relative to the first reflective surface.

An aspect of the present invention is a vehicle provided with a vehicular headlamp, wherein the reflector is divided into three parts to be an upper reflector positioned above a reference plane including the light axis and a vehicle-transversely level line, a lower reflector positioned below the reference plane, and an intermediate reflector intersecting the reference plane, the intermediate reflector is configured to have the first reflective surface, light from the light-source bulb reflected therefrom being provided to the vehicle as a reference light-distribution pattern, the upper reflector is configured to have the second reflective surface, light from the light-source bulb reflected therefrom being provided as a dispersed light-distribution pattern relative to the reference light-distribution pattern, and the lower reflector is configured to have the third reflective surface, light from the light-source bulb reflected therefrom being provided as a collimated light-distribution pattern relative to the reference light-distribution pattern.

As a result of this configuration, in a vehicle provided with a vehicular head lamp according to the present invention, the upper reflector is caused to rotate with respect to the intermediate reflector, so that the dispersed light-distribution pattern is changed with respect to the fixed reference light-distribution pattern, and the lower reflector is caused to rotate with respect to the intermediate reflector, so that the collimated light-distribution pattern is changed with respect to the fixed reference light-distribution pattern, these changes in light-distribution patterns improving the visibility in a curve.

Another aspect of the present invention is a vehicle provided with a vehicular head lamp, wherein the reflector is divided into two parts to be an upper reflector positioned above a reference plane including the light axis and a vehicle-transversely level line, and a lower reflector intersecting the reference plane, wherein the lower reflector is configured to have the first reflective surface, light from the light-source bulb reflected therefrom being provided to the vehicle as a reference light-distribution pattern, the upper reflector is configured to have the second reflective surface, light from the light-source bulb reflected therefrom being provided as a dispersed light-distribution pattern relative to the reference light-distribution pattern, and the upper reflector is pivotable about an axis inclined toward the rear relative to the vehicle.

As a result of this configuration, in a vehicle provided with a vehicular head lamp according to the present invention, the upper reflector is caused to rotate with respect to the intermediate reflector, so that the dispersed light-distribution pattern is changed with respect to the fixed reference light-distribution pattern, and the lower reflector is caused to rotate with respect to a vertical axis, so that the dispersed light-distribution pattern is lowered to in front of the vehicle. For this reason, there is an improvement in the visibility in a curve.

BRIEF DESCRIPTION OF THE DRAWINGS

The above and other features will be better understood from the exemplary embodiments described below, taken together with the drawings, of which.

DETAILED DESCRIPTION OF THE PREFERRED EMBODIMENTS

Figure 1:
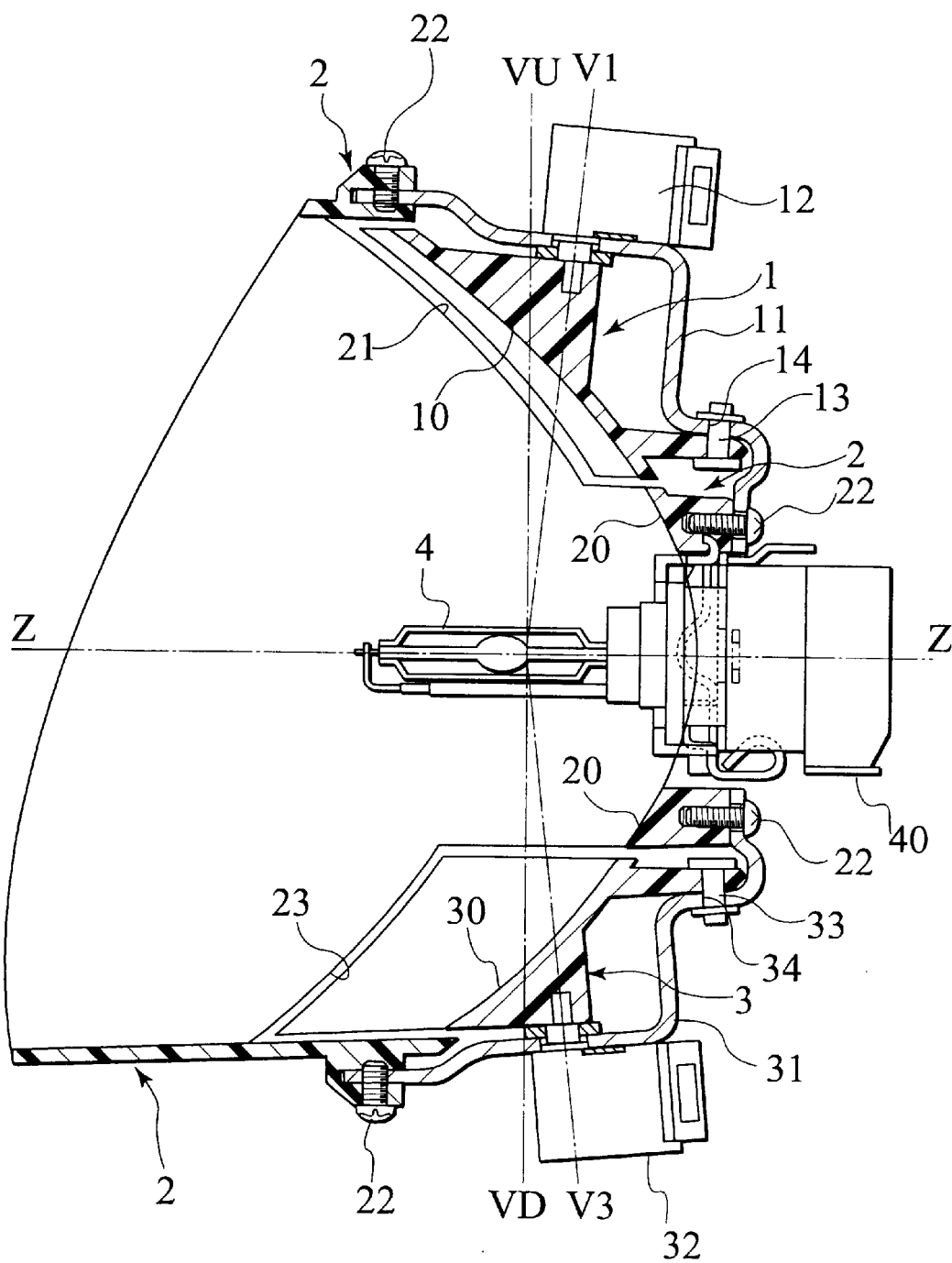
FIG. 1 is a vertical cross-sectional view of the main part (reflector) of a first embodiment of a vehicular head lamp according to the present invention, representing a cross-sectional view along the cutting line I—I of FIG. 2.

Embodiments of a vehicular head lamp according to the present invention are described in detail below, with references made to relevant accompanying drawings.

FIG. 1 to FIG. 6 illustrate a first embodiment of the present invention.

In these drawings, the reference numerals 1, 2, and 3 denote the three sub-reflector sections, 1 being an upper reflector above the light axis Z-Z, 2 being an intermediate reflector encompassing the light axis Z-Z, and 3 being a lower reflector below the light axis Z-Z.

Figure 2:
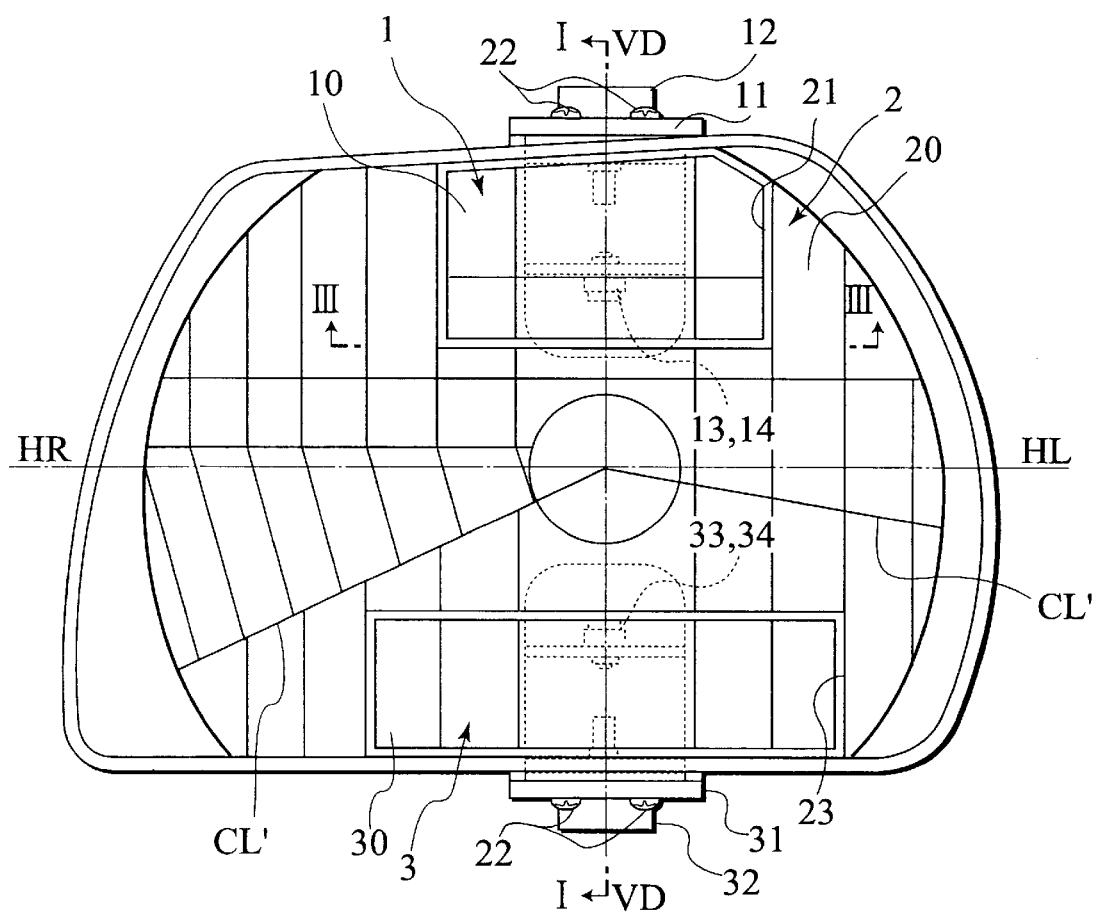
FIG. 2 is a front elevation of the main part of the first embodiment of the present invention.

The upper reflector 1, is divided from the upper part of the intermediate reflector 2, that is, the part above the horizontal axis HR-HL, so as to be substantially rectangular and symmetrical left-to-right about the vertical axis VU-VD when viewed from the front as shown in FIG. 2.

The lower reflector 1, is divided from the lower part of the intermediate reflector 2, that is, the part below the horizontal axis HR-HL, so as to be substantially rectangular and symmetrical left-to-right about the vertical axis VU-VD when viewed from the front as shown in FIG. 2.

The upper reflector 1 and the lower reflector 3 are formed by cutting out of a part of the intermediate reflector 2 above the light axis Z-Z and cutting out of a part of the intermediate reflector 2 below the light axis Z-Z. As a result, substantially rectangular apertures 21 and 23 are formed in the upper part and the lower part of the intermediate reflector 2. The intermediate reflector 1 and the lower reflector 2 are disposed at the upper aperture 21 and the lower aperture 23, respectively, of the intermediate reflector 2.

The intermediate reflector 2 is a fixed reflector fixed to a lamp housing (not shown in the drawing) via a bracket (not shown in the drawing). A discharge lamp (a high-pressure metal deposition discharge lamp such as a metal halide lamp or high-intensity discharge (HID) lamp) 4 is detachably mounted to a socket 40 at the substantially center part of the intermediate reflector 2. A reflective surface 20 forming a prescribed low-beam light-distribution pattern LP (used when passing opposing-direction vehicles) is provided on an inner surface of the intermediate reflector 2. This low-beam light-distribution pattern LP serves as the reference light-distribution pattern. The low-beam light-distribution pattern LP has a shape indicated by the solid line in FIG. 4, and by the solid line and part of the broken line in FIG. 5 and FIG. 6.

The upper reflector 1 is rotatable with respect to the intermediate reflector 2, the two ends of a substantially L-shaped (viewed from the side thereof) upper mounting bracket 11 being fixed to the upper and lower edges of the upper aperture 21 of the intermediate reflector 2 by screws 22. The upper mounting bracket 11 is mounted so that it straddles across the upper edge and the lower edge of the upper aperture 21 of the intermediate reflector 2. An upper drive motor 12 is fixed at the substantially central part of the upper mounting bracket 11 as a drive means. The upper reflector 1 is fixed to a drive shaft of the upper drive motor 12. As a result, the upper reflector 1 can rotate with respect to the intermediate reflector 2. The upper reflector 1 can rotate to the left and right about an upper axis V1, which is inclined rearward with respect to the vertical axis VU-VD. Additionally, a reflective surface 10 forming a dispersed light-distribution pattern WP is provided on an inner surface of the upper reflector 1. The dispersed light-distribution pattern WP has a shape indicated by the solid line protruding outward from the broken line of FIG. 5 and FIG. 6, forming a so-called drooping-eye shape.

The lower reflector 3 is not actively used in the case of the low-beam light-distribution pattern LP, which, of the reflectors 1, 2, and 3, is formed above the line CL' (FIG. 2) forming the cutting line CL. For this reason, of the reflectors 1, 2, and 3, the part below the cutting line CL is not actively used. The lower reflector 3 is rotatable with respect to the intermediate reflector 2, the two ends of a substantially L-shaped (viewed from the side thereof) lower mounting bracket 31 being fixed to the upper and lower edges of the lower aperture 23 of the intermediate reflector 2 by screws 22. The lower mounting bracket 31 is mounted so that it straddles across the upper edge and the lower edge of the upper aperture 23 of the intermediate reflector 2. A lower drive motor 32 is fixed at the substantially central part of the lower mounting bracket 11 as a drive means. The lower reflector 3 is fixed to a drive shaft of the lower drive motor 32. As a result, the lower reflector 3 can rotate with respect to the intermediate reflector 2. The lower reflector 3 can rotate to the left and right about a lower axis V3, which is inclined rearward with respect to the vertical axis VU-VD. Additionally, a reflective surface 30 forming a collimated light-distribution pattern SP is provided on an inner surface of the upper reflector 1. The collimated light-distribution pattern SP has a shape indicated by the solid and broken lines of FIG. 4 to FIG. 6, forming a so-called cats-eye shape.

Upper guide mechanisms 13 and 14 are interposed between the upper reflector 1 and the upper mounting bracket 11, and lower guide mechanisms 33 and 34 are interposed between the lower reflector 3 and the lower mounting bracket 31. The upper and lower guide mechanisms are formed by guide pins 13 and 33 fixed to upper reflector 1 and the lower reflector 3, and guide grooves 14 and 34 provided in the shape of arcs about the upper axis V1 and lower axis V3 on the upper bracket 11 and the lower bracket 31, so that the guide pins 13 and 33 are slidable in the guide grooves 14 and 34.

The above-noted upper reflector 1, intermediate reflector 2, lower reflector 3, discharge lamp 4, upper drive motor 12, lower drive motor 32, and upper and lower guide mechanisms 13, 14, 33, and 34 are disposed within a lamp chamber (not shown in the drawing) delineated by a lamp housing and a front lens or front cover (not shown in the drawing), thereby forming a vehicular head lamp, which is installed at the left and right of the front of a vehicle. The intermediate reflector 2, along with the upper reflector 1 and lower reflector 3, is mounted into the lamp housing via an intervening left-right light-axis adjustment mechanism (not shown in the drawing) and an intervening up-down light-axis adjustment mechanism (not shown in the drawing), so as to enable adjustment of the light axis left-and-right and up-and-down.

The vehicular head lamp according to the first embodiment configured as described above is used as follows.

Figure 3:
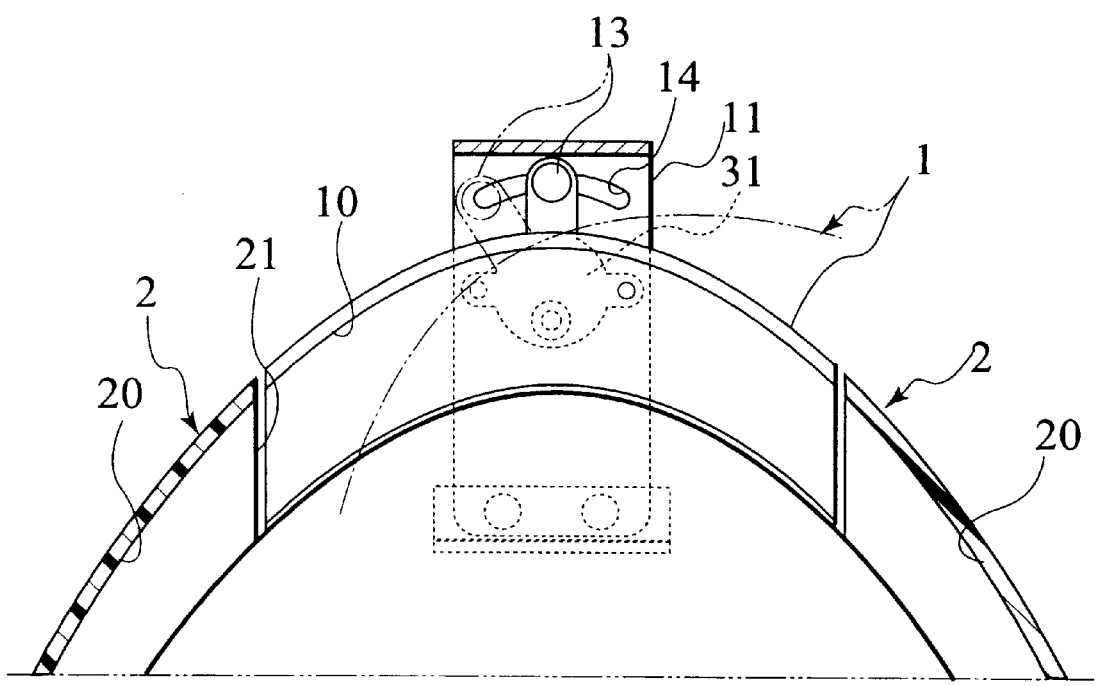
FIG. 3 is a cross-sectional view along the cutting line III—III of FIG. 2.
Figure 4:
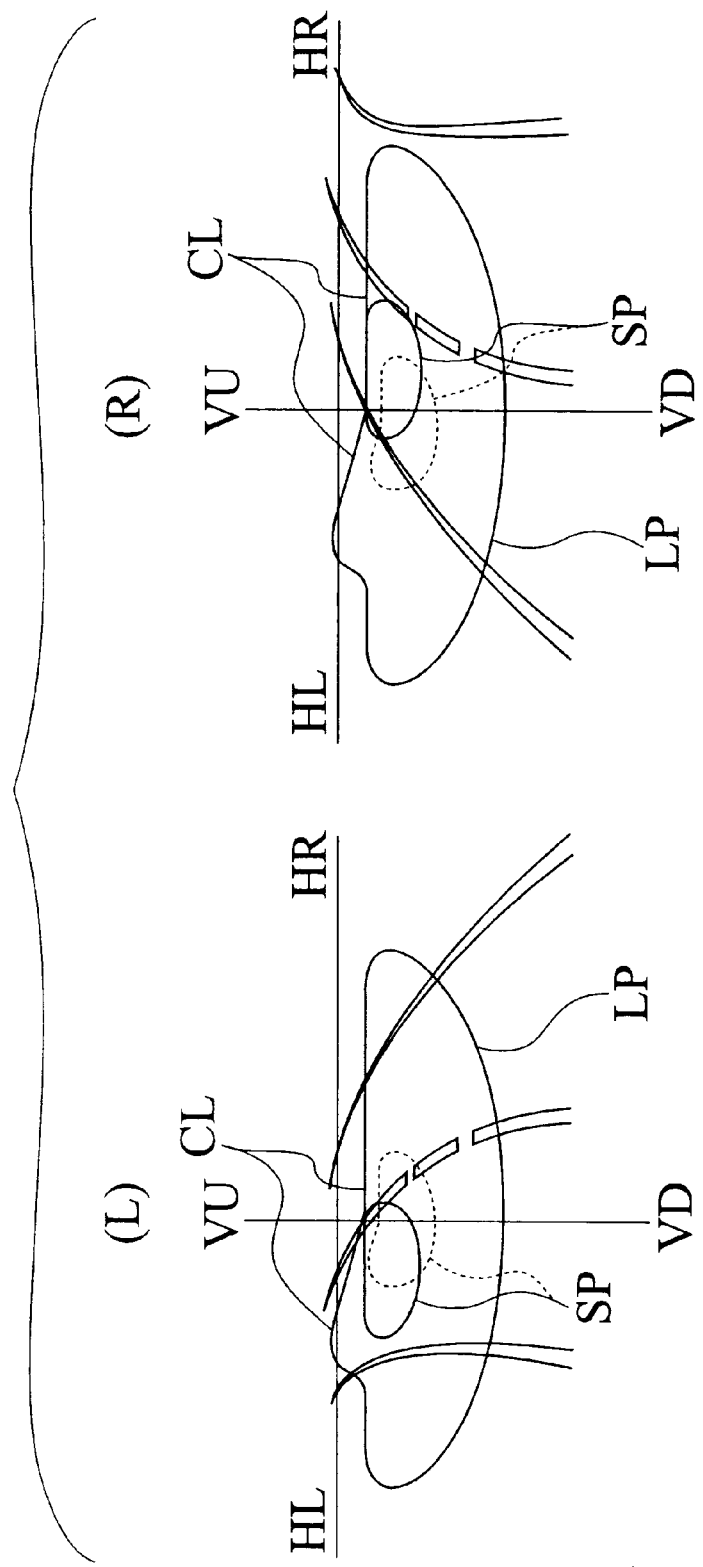
FIG. 4 is a drawing illustrating the light-distribution pattern, (L) being the light-distribution through a left curve negotiated at a high speed, and (R) being the light-distribution pattern through a right curve negotiated at a high speed.
Figure 5:
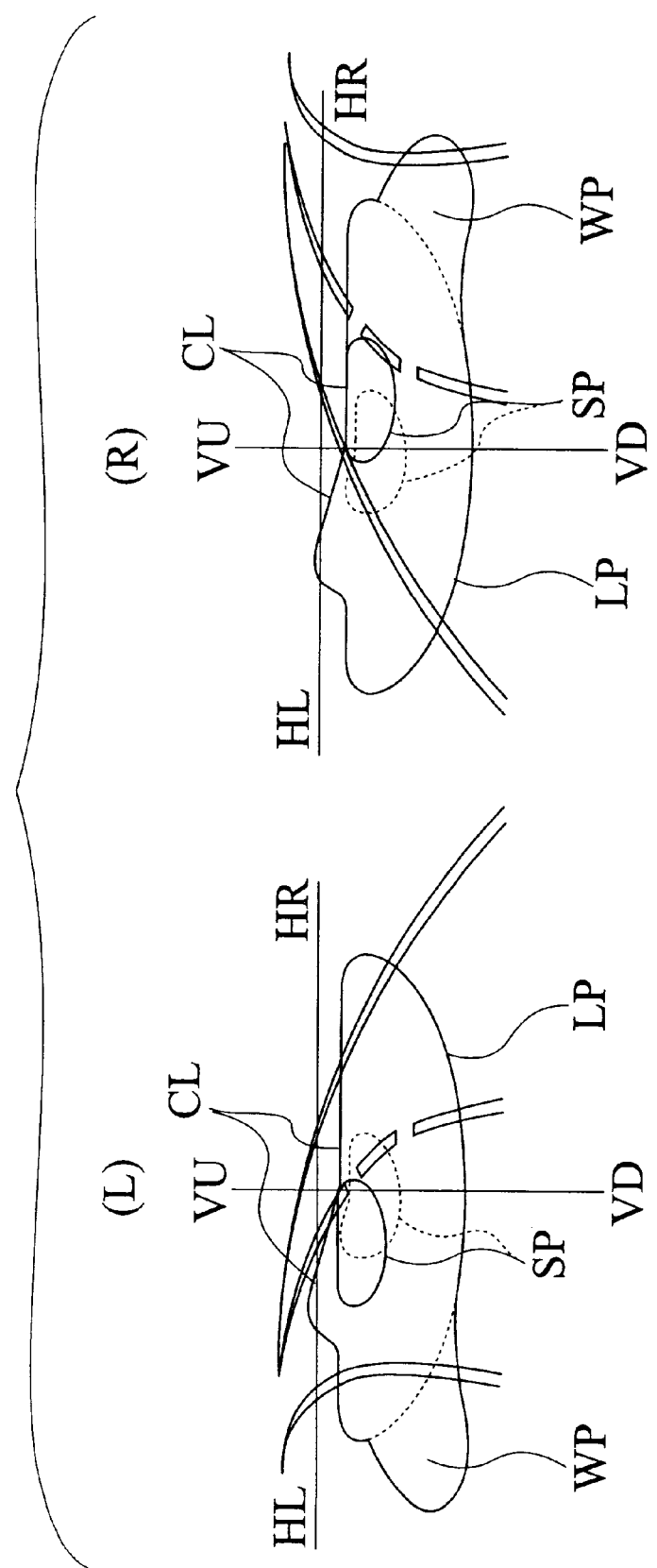
FIG. 5 is a drawing illustrating the light-distribution pattern, (L) being the light-distribution through a left curve negotiated at a medium speed, and (R) being the light-distribution pattern through a right curve negotiated at a medium speed.
Figure 6:
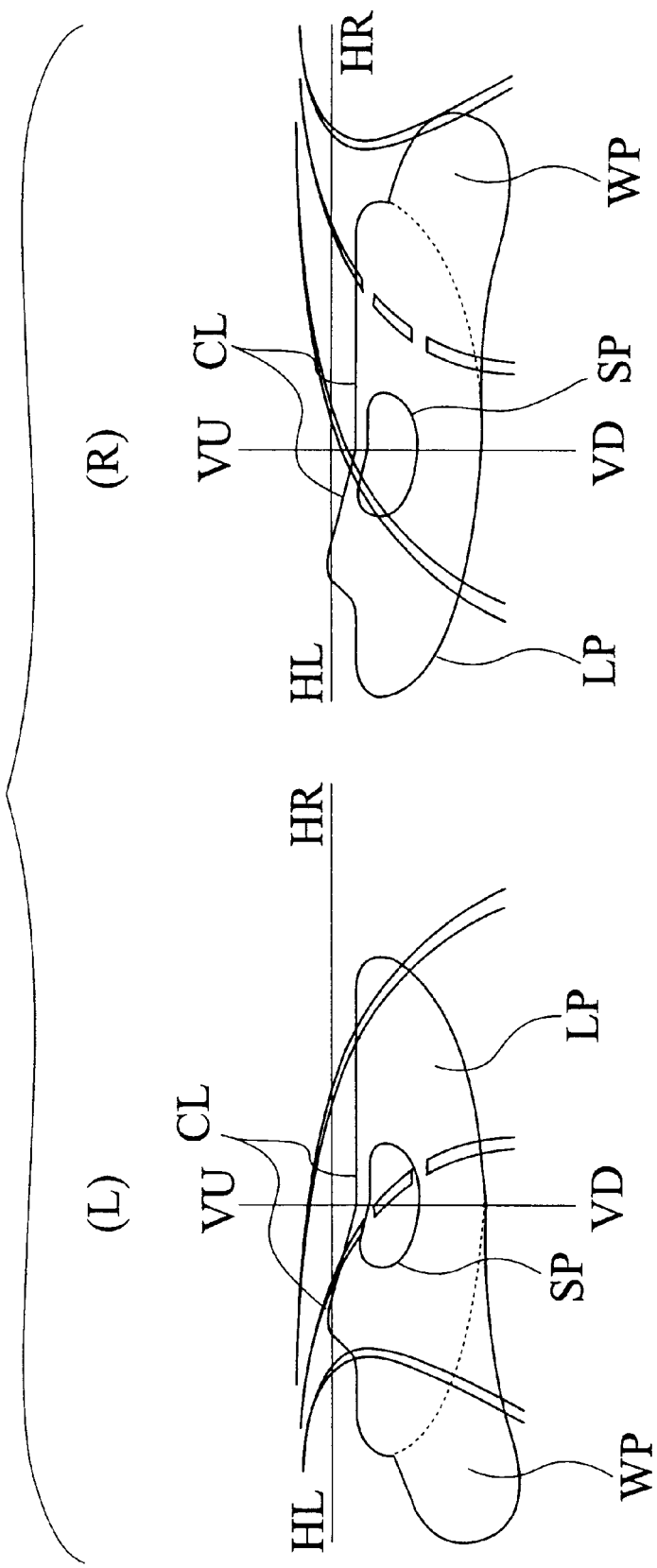
FIG. 6 is a drawing illustrating the light-distribution pattern, (L) being the light-distribution through a left curve negotiated at a low speed, and (R) being the light-distribution pattern through a right curve negotiated at a low speed.

With the vehicle traveling in a straight line, the upper reflector 1 and the lower reflector 3 are at the neutral position, as shown in FIG. 3. When the discharge lamp 4 is lighted, light therefrom is reflected by the reflective surface 10 of the upper reflector 1, the reflective surface 20 of the intermediate reflector 2, and the reflective surface 30 of the lower reflector 3, so that a prescribed low-beam light-distribution pattern LP as shown by the solid line of FIG. 4 and the partial broken line of FIG. 5 and FIG. 6 is obtained. Under this condition, the collimated light-distribution pattern SP is slightly below the cutting line CL of the low-beam light-distribution pattern LP, as shown by the solid line of FIG. 6, and is positioned to the left and right about the vertical axis VU-VD. The dispersed light-distribution pattern WP is positioned within the low-beam light-distribution pattern LP.

Next, if the vehicle negotiates a left turn at a high speed, the lower drive motor 32 is driven in accordance with the turning angle and running speed of the vehicle, so that the lower reflector 3 is rotated through a prescribed commanded angle about the lower axis V3. As a result, as shown in FIG. 4(L), the collimated light-distribution pattern SP is swung from the position indicated by the broken line to the position indicated by the solid line, slightly to the upper left, along the curve. In a similar manner, if a right curve is negotiated by the vehicle, the lower drive motor 32 is driven in accordance with the turning angle and running speed of the vehicle so that the lower reflector 3 is rotated through a prescribed commanded angle toward the right, about the lower axis V3. The result is that, as shown in FIG. 4(R), the collimated light-distribution pattern SP is swung from the position indicated by the broken line to the position indicated by the solid line, slightly to the upper right, along the curve.

If the vehicle negotiates a left curve at a medium speed, the upper drive motor 12 and the lower drive motor 32 are driven in accordance with the turning angle and running speed of the vehicle so that the upper reflector 1 is rotated to the left through a prescribed commanded angle about the upper axis V1 and so that the lower reflector 3 is rotated to the left through a prescribed commanded angle, about the lower axis V3. The result is that, as shown in FIG. 5(L), the dispersed light-distribution pattern WP is swung from the position indicated for the low-beam light-distribution pattern LP by the broken line to the position indicated by the solid line, slightly to the lower left, along the curve, and that the collimated light-distribution pattern SP is swung from the position indicated by the broken line to the position indicated by the solid line, slightly to the upper left, along the curve. In a similar manner, if the vehicle negotiates a right curve at a medium speed, the upper drive motor 12 and the lower drive motor 32 are driven in accordance with the turning angle and running speed of the vehicle so that the upper reflector 1 is rotated to the right through a prescribed commanded angle about the upper axis V1 and so that the lower reflector 3 is rotated to the right through a prescribed commanded angle about the lower axis V3. The result is that, as shown in FIG. 4(R), the dispersed light-distribution pattern WP is swung from the position of the low-beam light-distribution pattern LP indicated by the broken line to the position indicated by the solid line, slightly to the lower right, along the curve, and that the collimated light-distribution pattern SP is swung from the position indicated by the broken line to the position indicated by the solid line, slightly to the upper right, along the curve.

If the vehicle negotiates a left curve at a low speed, the upper drive motor 12 is driven in accordance with the turning angle and running speed of the vehicle so that the upper reflector 1 is rotated through a prescribed commanded angle to the left about the upper axis V1. The result is that, as shown in FIG. 6(L), the dispersed light-distribution pattern WP is swung from the position of the low-beam light-distribution pattern LP indicated by the broken line to the position indicated by the solid line, slightly to the lower left, so that the light is swung along the curve more than in the case of a medium-speed curve. In a similar manner, if the vehicle negotiates a right curve at a low speed, the upper drive motor 12 is driven is accordance with the turning angle and running speed of the vehicle so that the upper reflector 1 is rotated through a prescribed commanded angle to the right about the upper axis V1. The result is that, as shown in FIG. 6(R), the dispersed light-distribution pattern WP is swung from the position of the low-beam light-distribution pattern LP indicated by the broken line to the position indicated by the solid line, slightly to the lower right, so that the light is swung along the curve more than in the case of a medium-speed curve.

Thus, in the vehicular head lamp according to the first embodiment of the present invention, by causing the upper reflector 1 to rotate relative to the intermediate reflector 2, the dispersed light-distribution pattern WP is changed with respect to the fixed reference low-beam light-distribution pattern LP, and by causing the lower reflector 2 to rotate relative to the intermediate reflector 2, the collimated light-distribution pattern SP is changed with respect to the fixed reference low-beam light-distribution pattern LP. The result of these changes is an improvement in visibility of pedestrians and obstacles on a road at night.

In particular, because the first embodiment enables rotation of the upper reflector 1 about the upper axis V1, which is inclined rearward with respect to the vertical axis VU-VD, when running at a medium or low speed, when the upper reflector 1 rotates the dispersed light-distribution pattern WP is swung slightly to the lower left or lower right, resulting in a so-called drooping-eye shape, thereby illuminating the area in front of the moving vehicle. Additionally, because the lower reflector 3 can rotate about the lower axis V3, which is rearward inclined with respect to the vertical axis VU-VD, when running at a medium or high speed, when the lower reflector 3 rotates, the collimated light-distribution pattern SP is swung slightly to the upper left or upper right, resulting in a so-called cats-eye shape, thereby illuminating an area distant from the vehicle in the direction of movement. As a result, there is a further improvement in visibility along a curve.

In the first embodiment, because the upper reflector 1 and the lower reflector 3 are rotatably disposed in the upper aperture 21 and the lower aperture 23 of the intermediate reflector 2, the area surrounding the movable upper reflector 1 and lower reflector 3 is surrounded by the fixed intermediate reflector 2, so that even if the upper reflector 1 and lower reflector 3 rotate, there is no change in the outer shape of the intermediate reflector 2. Thus, because the outer shape of the shining reflector does not change, the design of the light-emitting surface is not sacrificed. Furthermore, of the intermediate reflector 2, the locations at which the upper reflector 1 and lower reflector 3 are disposed are cut out, so as to form the upper aperture 21 and the lower aperture 23, so that the rigidity of the intermediate reflector 2 is not lost.

Additionally, in the first embodiment, because the two ends of an upper mounting bracket 11 and a lower mounting bracket 31 are fixed to the upper and lower edges of the upper aperture 21 and the lower aperture 23 of the intermediate reflector 2, that is, because the upper mounting bracket 11 and the lower mounting bracket 41 are supported at both ends, the rigidity (for example, torsional rigidity) of the upper mounting bracket 11 and the lower mounting bracket 31 is great. Furthermore, because the upper reflector 1 and the lower reflector 3 are also supported at both ends thereof by the highly rigid upper mounting bracket 11 and lower mounting bracket 31, via the upper drive motor 12, the lower drive motor 32, the upper guide mechanisms 13 and 14, and the lower guide mechanisms 33 and 34, the precision of the light distribution is improved, and there is an improvement in immunity to vibration of the vehicle.

In addition to the above, in the first embodiment of the present invention, in the case of the low-beam light-distribution pattern LP, by using the lower reflector 3, which has not particularly been used in the past, it is possible to maintain the amount of light from the basic low-beam light-distribution pattern LP while making sufficient use of light from the discharge lamp 4. Thus, the basic low-beam light-distribution pattern LP was formed above the line CL' that forms the cutting line CL of the reflectors 1, 2, and 3. For this reason, of the reflectors 1, 2, and 3 the part below the cutting line CL' was not used, light striking this lower reflector not being actively used. In particular when using a discharge lamp 4 as the light-source bulb, using a new discharge lamp 4 emitting a large amount of light and making use of the part of the reflectors 1, 2, and 3 above the cutting line CL', a sufficient amount of light was obtained, and the amount of light not used was large. With the first embodiment of the present invention, however, because light not formerly used is actively used, it is possible as noted above to make sufficiently effective use of the light from the discharge lamp 4, while maintaining the amount of light in the basic low-beam light-distribution pattern LP.

Furthermore, in the first embodiment by linking the dispersed light-distribution pattern WP and the collimated light-distribution pattern SP based on the turning angle and running speed of the vehicle or changing these patterns independently, it is possible to perform accurate control of the relative distributions of the dispersed light-distribution pattern WP and the collimated light-distribution pattern SP, resulting in a commensurate improvement in visibility along a curve negotiated by the vehicle.

Although the first embodiment of the present invention is described above for the case in which a discharge lamp 4 is used as a light-source bulb, it will be understood that it is alternately possible to use, for example, a single-filament light-source lamp, or a double-filament light-source lamp with no light-blocking plate within the glass envelope. In this case, the reference light-distribution pattern can be either the low-beam light-distribution pattern LP or the high-beam light-distribution pattern.

FIG. 7 to FIG. 10 show a second embodiment of a vehicular head lamp according to the present invention, in elements corresponding to elements in FIG. 1 to FIG. 6 are assigned the same reference numerals.

The second embodiment uses a double-filament light-source bulb 400 as a light-source bulb.

The vehicular head lamp according to the second embodiment of the present invention is configured as noted above, and can be used as described below.

Figure 7:
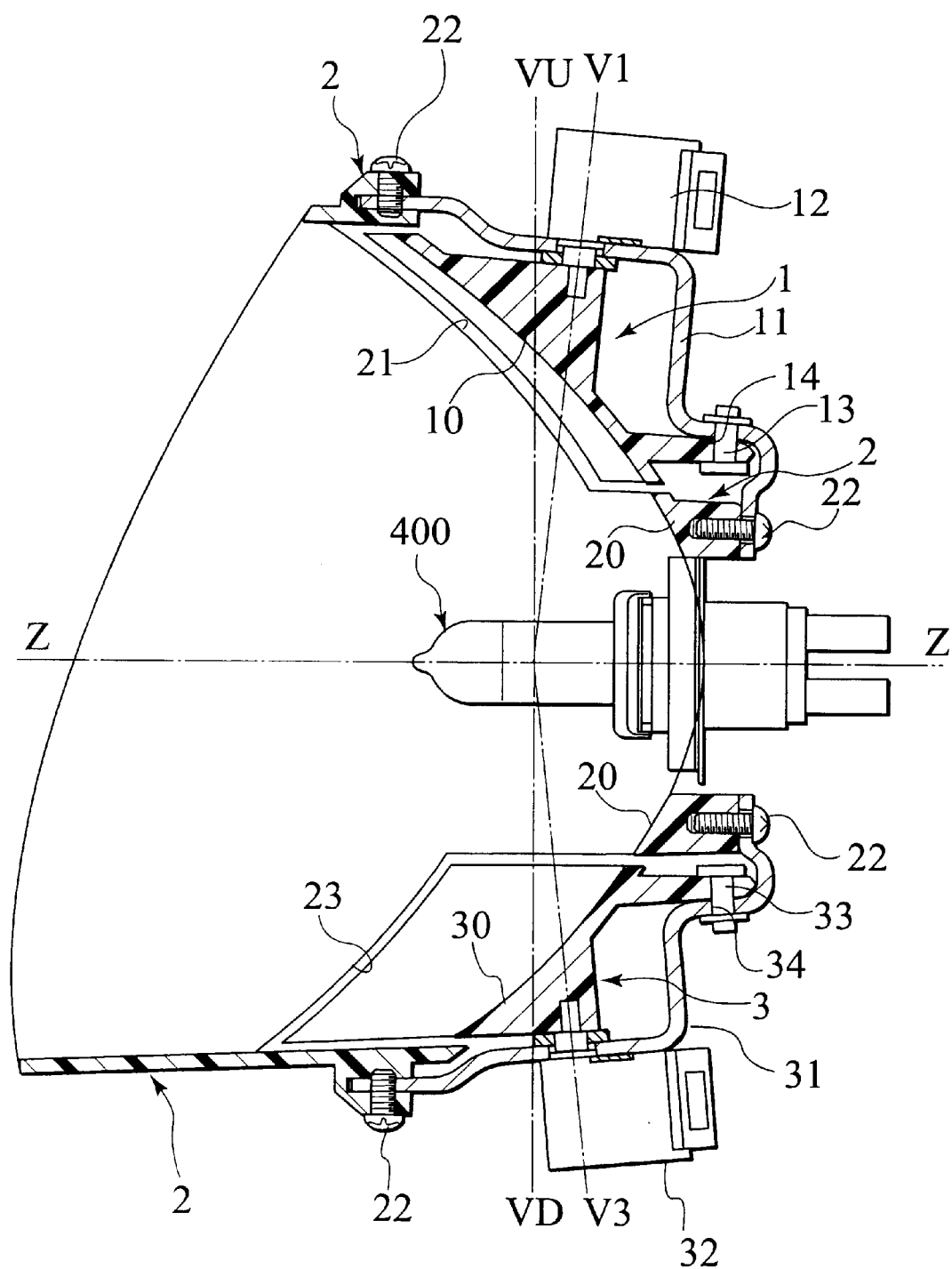
FIG. 7 is a vertical cross-sectional view of the main part (reflector) of a second embodiment of a vehicular head lamp according to the present invention.
Figure 8:
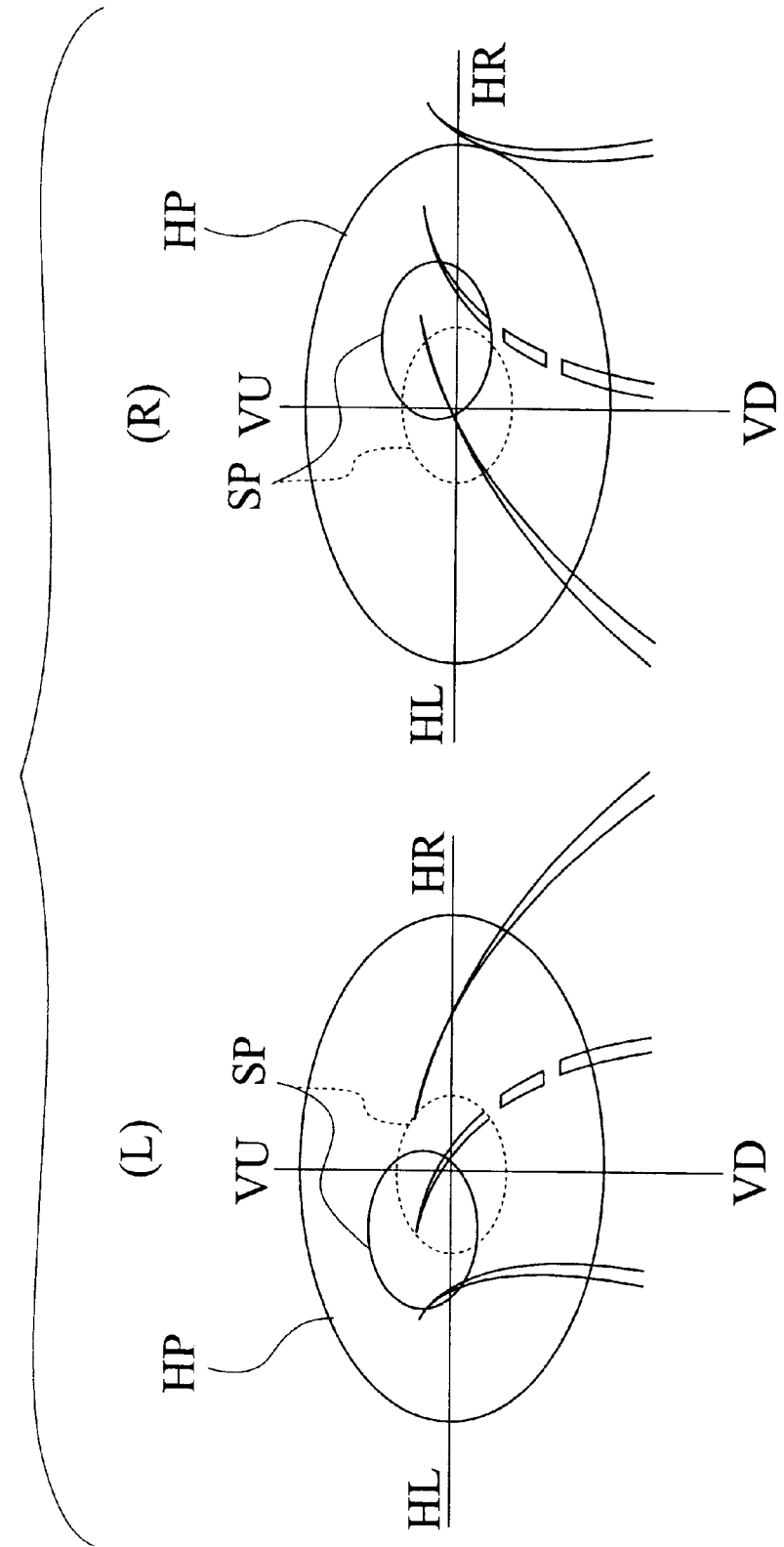
FIG. 8 is a drawing illustrating the light-distribution pattern, (L) being the light-distribution through a left curve negotiated at a high speed with the high-beam filament lighted, and (R) being the light-distribution pattern through a right curve negotiated at a high speed with the high-beam filament lighted.

With the vehicle traveling in a straight line, the upper reflector 1 and the lower reflector 3 are at the neutral position, as shown in FIG. 7. When the light-source bulb 400 is lighted, light from a high-beam filament (not shown in the drawing) thereof is reflected by the reflective surface 10 of the upper reflector 1, the reflective surface 20 of the intermediate reflector 2, and the reflective surface 30 of the lower reflector 3, so that a prescribed high-beam light-distribution pattern HP as shown by the solid line of FIG. 8 is obtained. Under this condition, the collimated light-distribution pattern SP, as shown by the broken line of FIG. 8, is positioned in a region above and below and to the left and right of the point of intersection between the vertical axis VU-VD and the horizontal axis HL-HR. The dispersion light-distribution pattern WP is positioned within the high-beam light-distribution pattern.

When the high-beam filament of the light-source bulb 400 is lighted with the vehicle chiefly traveling at a high speed, when the vehicle negotiates a left curve, the lower drive motor 32 is driven in accordance with information with regard to turning angle and running speed of the vehicle, so that the lower reflector 3 is swung through a prescribed commanded angle toward the left, about the lower axis V3. As a result, as shown in FIG. 8(L), the collimated light-distribution pattern SP is swung from the position indicated by the broken line to the position indicated by the solid line, slightly to the upper left, along the curve. Similarly, when the vehicle negotiates a right curve, the lower drive motor 32 is driven in accordance with information with regard to turning angle and running speed of the vehicle, so that the lower reflector 3 is swung through a prescribed commanded angle toward the right, about the lower axis V3. As a result, as shown in FIG. 8(R), the collimated light-distribution pattern SP is swung from the position indicated by the broken line to the position indicated by the solid line, slightly to the upper right, along the curve.

Figure 9:
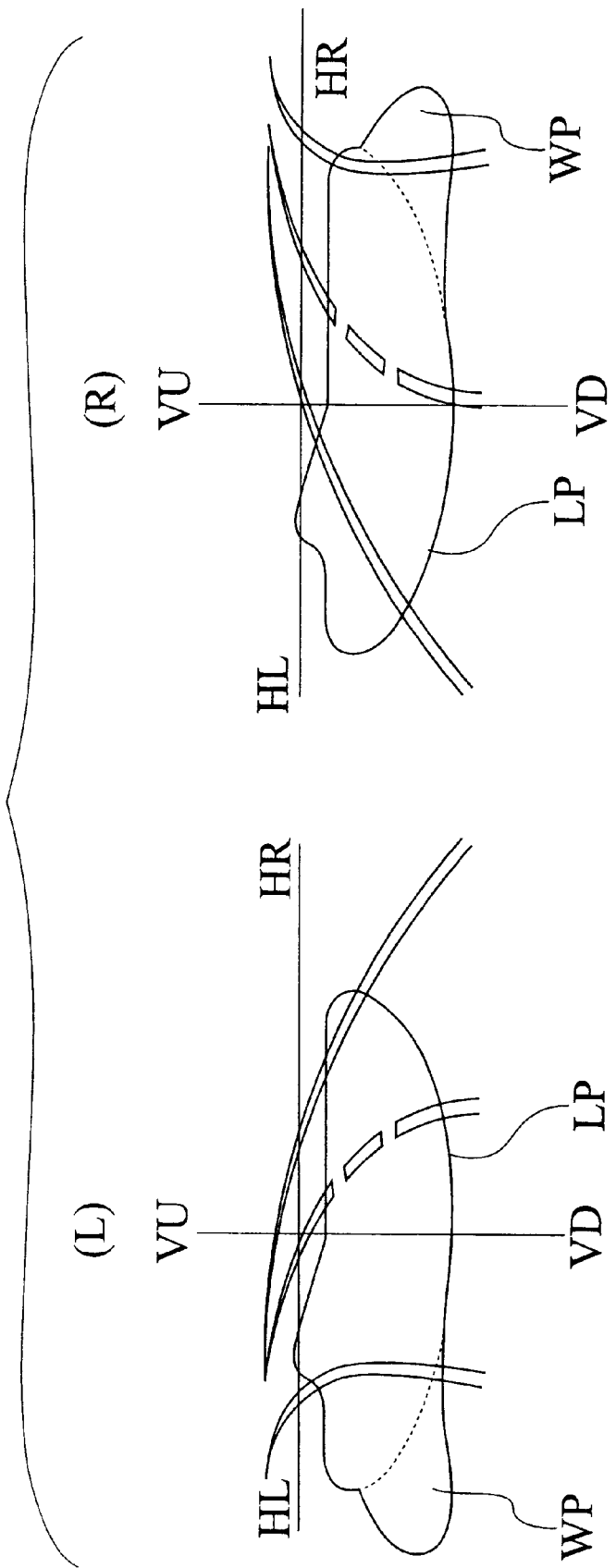
FIG. 9 is a drawing illustrating the light-distribution pattern, (L) being the light-distribution through a left curve negotiated at a medium speed with the low-beam filament light, and (R) being the light-distribution pattern through a right curve negotiated at a medium speed with the low-beam filament light.
Figure 10:
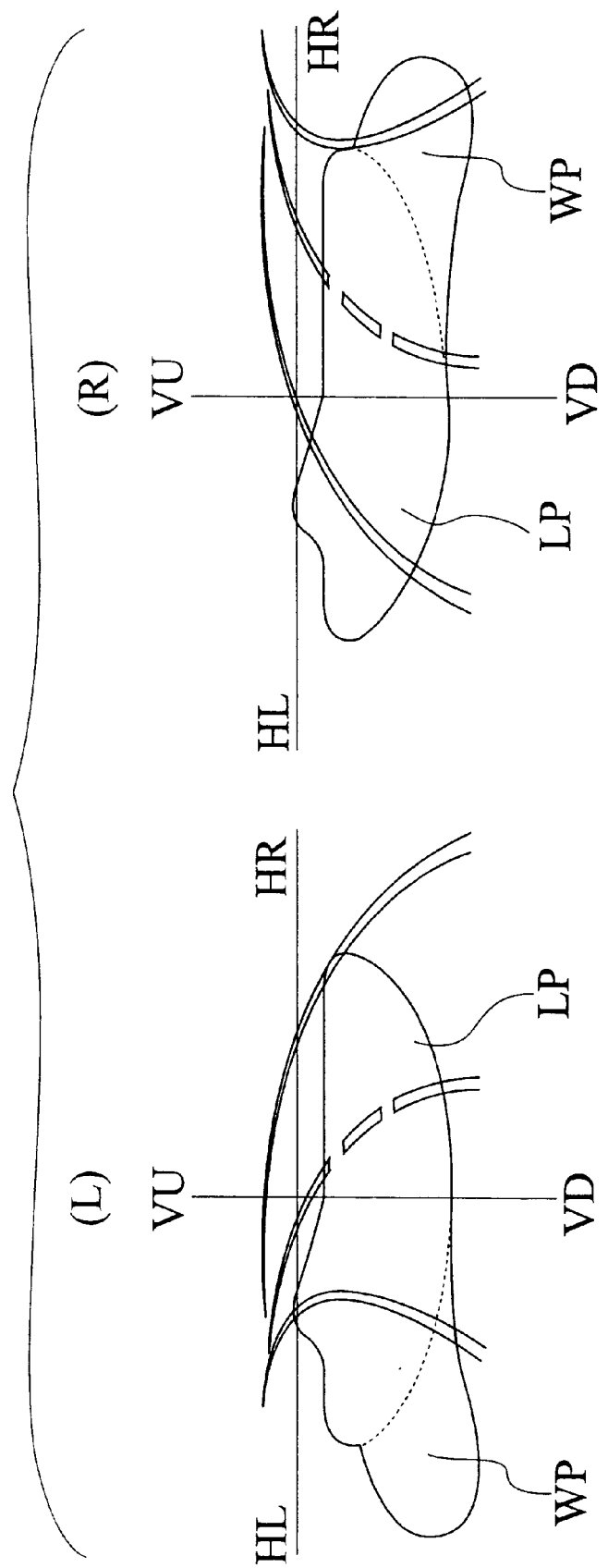
FIG. 10 is a drawing illustrating the light-distribution pattern, (L) being the light-distribution through a left curve negotiated at a low speed with the low-beam filament light, and (R) being the light-distribution pattern through a right curve negotiated at a low speed with the low-beam filament light.

With the upper reflector and the lower reflector 3 in the neutral position, if the high-beam filament (not shown in the drawing) of the light-source bulb 400 is lighted, the light from the high-beam filament is reflected by the reflective surface 10 of the upper reflector 1 and the reflective surface 20 of the intermediate reflector 2, so that a prescribed low-beam light-distribution pattern LP is obtained as indicated by the solid and partial broken lines in FIG. 9 and FIG. 10. Under this condition, because of the light-blocking plate (not shown in the drawing) disposed within the glass envelope of the light-source bulb 400, light from the low-beam filament is blocked from reaching the reflective surface 30 of the lower reflector 3, a collimated light-distribution pattern SP is not obtained. The dispersed light-distribution pattern WP is positioned within the low-beam light-distribution pattern LP.

If the vehicle negotiates a left curve while running at a medium speed with the low-beam filament of the light-source bulb 400 lighted, the upper drive motor 12 is driven in accordance with information with regard to the turning angle and running speed of the vehicle, so that the upper reflector 1 is rotated toward the left through a prescribed commanded angle about the upper axis V1. The result is that, as shown in FIG. 9(L), the dispersed light-distribution pattern WP moves from the low-beam light-distribution pattern LP indicated by the broken line to the position indicated by the solid line, slightly to the lower left, along the curve. In a similar manner, if the vehicle negotiates a right curve while running at a medium speed with the low-beam filament of the light-source bulb 400 lighted, the upper drive motor 12 is driven in accordance with information with regard to the turning angle and running speed of the vehicle, so that the upper reflector 1 is rotated toward the right through a prescribed commanded angle about the upper axis V1. The result is that, as shown in FIG. 9(R), the dispersed light-distribution pattern WP moves from the low-beam light-distribution pattern LP indicated by the broken line to the position indicated by the solid line, slightly to the lower right, along the curve.

If the vehicle negotiates a left curve while running at a low speed with the low-beam filament of the light-source bulb 400 lighted, the upper drive motor 12 is driven in accordance with information with regard to the turning angle and running speed of the vehicle, so that the upper reflector 1 is rotated toward the left through a prescribed commanded angle about the upper axis V1. The result is that, as shown in FIG. 10(L), the dispersed light-distribution pattern WP moves from the position of the low-beam light-distribution pattern LP indicated by the broken line to the position indicated by the solid line, slightly to the lower left, so that the swing along the curve is greater than in the case of running at a medium speed. In a similar manner, if the vehicle negotiates a right curve while running at a low speed with the low-beam filament of the light-source bulb 400 lighted, the upper drive motor 12 is driven in accordance with information with regard to the turning angle and running speed of the vehicle, so that the upper reflector 1 is rotated toward the right through a prescribed commanded angle about the upper axis V1. The result is that, as shown in FIG. 10(R), the dispersed light-distribution pattern WP moves from the position of the low-beam light-distribution pattern LP indicated by the broken line to the position indicated by the solid line, slightly to the lower right, so that the swing along the curve is greater than in the case of running at a medium speed.

Thus, in a vehicular head lamp according to the second embodiment of the present invention, by causing the upper reflector 1 to rotate relative to the intermediate reflector 2, the dispersed light-distribution pattern WP is changed with respect to the fixed reference low-beam light-distribution pattern LP, and by causing the lower reflector 2 to rotate relative to the intermediate reflector 2, the collimated light-distribution pattern SP is changed with respect to the reference high-beam light-distribution pattern HP, the result being an improvement in visibility along a curve at night.

The second embodiment can achieve the same type of effect as described with regard to the first embodiment.

In particular, in the second embodiment by linking the dispersed light-distribution pattern WP and the collimated light-distribution pattern SP based on information with regard to the turning angle and running speed of the vehicle or changing these patterns independently, it is possible to perform accurate control of the relative distributions of the dispersed light-distribution pattern WP and the collimated light-distribution pattern SP, resulting in a commensurate improvement in visibility along a curve negotiated by the vehicle.

While the first and second embodiments are described for the case in which the upper axis V1 and the lower axis V3 are inclined toward the rear with respect to the vertical axis VU-VD, it will be understood that it is alternately acceptable that the upper axis V1 and the lower axis V3 be vertical.

Additionally, although the first and second embodiments are described above for the case in which area surrounding the upper reflector 1 and the lower reflector 3 is surrounded by the intermediate reflector 2, it will be understood that that it is alternately possible to have a configuration in which the lower reflector 3 is not surrounded by the intermediate reflector 2.

Additionally, although the first and second embodiments are described above for the case in which the upper mounting bracket 11 and the lower mounting bracket 31 are supported at both ends, a cantilever support configuration can also be adopted, and although the first and second embodiments have the upper reflector 1 and the lower reflector 3 supported at both ends by the upper mounting bracket 11 and the lower mounting bracket 31, it is alternately possible to adopt a cantilever support configuration.

Additionally, the above-described low-beam light-distribution pattern LP, high-beam light-distribution pattern HP, dispersed light-distribution pattern WP, and collimated light-distribution pattern SP can be controlled by the reflective surfaces 10, 20, and 30, by the reflective surfaces 10, 20, and 30 and a front lens, and also be controlled by a front lens only.

In the above-described embodiments, the description is for the case in which the vehicular head lamp is applied as a headlamp for use in an area in which driving is done on the left side of the road, it will be understood that that the structure and the light-distribution patterns and the like would be reversed left-to-right for use in an area in which driving is done on the right side of the road.

Two further embodiments, of the second aspect of the present invention, are described in detail below, the third embodiment of the present invention being described with reference made to FIG. 11, FIG. 12, FIG. 3, FIG. 6, and FIG. 13.

In the drawings, the reference numerals 1 and 3 denote reflectors, these being an upper reflector 1 above a light axis Z-Z and a lower reflector 3, below the light axis Z-Z.

Figure 12:
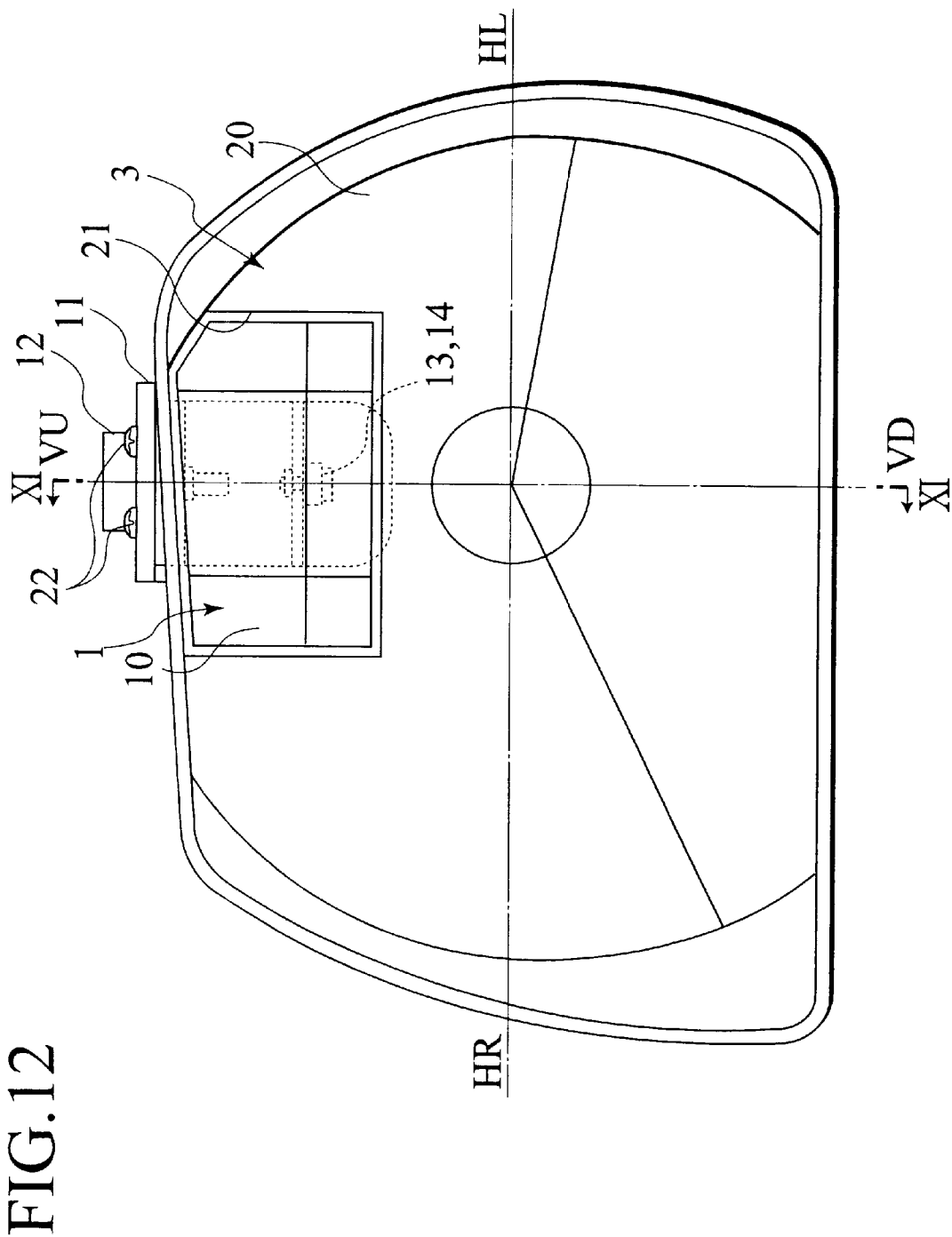
FIG. 12 is a front elevation of the main part of the third embodiment of the present invention.

The upper reflector 1 is divided from the upper part of the lower reflector 3, that is, the part above the horizontal axis HR-HL, so as to be substantially rectangular and symmetrical left-to-right about the vertical axis VU-VD when viewed from the front as shown in FIG. 12.

The upper reflector 1 is formed by cutting out of a part of the lower reflector 3 about the light axis Z-Z, so as to form a substantially rectangular aperture 21. The upper reflector 1 is disposed in the aperture 21 of the lower reflector 3.

The lower reflector 3 is a fixed reflector fixed to a lamp housing (not shown in the drawing) via a bracket (not shown in the drawing). A discharge lamp (a high-pressure metal deposition discharge lamp such as a metal halide lamp or high-intensity discharge (HID) lamp) 4 with a shield 41 is detachably mounted to a socket 40 at the substantially center part of the lower reflector 3. A reflective surface 20 forming a prescribed low-beam light-distribution pattern LP (used when passing opposing-direction vehicles) is provided on an inner surface of the lower reflector 3. This low-beam light-distribution pattern LP serves as the reference light-distribution pattern. The low-beam light-distribution pattern LP has a shape indicated by the solid line and part of the broken line in FIG. 6.

The upper reflector 1 is relatable with respect to the lower reflector 3, the two ends of a substantially L-shaped (viewed from the side thereof) mounting bracket 11 being fixed to the upper and lower edges of the aperture 21 of the lower reflector 3 by screws 22. The mounting bracket 11 is mounted so that it straddles across the upper edge and the lower edge of the aperture 21 of the lower reflector 3. A drive motor 12 is fixed at the substantially central part of the mounting bracket 11 as a drive means. The upper reflector 1 is fixed to a drive shaft of the drive motor 12. As a result, the upper reflector 1 can rotate with respect to the lower reflector 3. The upper reflector 1 can rotate to the left and right about an upper axis V1, which is inclined rearward with respect to the vertical axis VU-VD. Additionally, a reflective surface 10 forming a dispersed light-distribution pattern WP is provided on an inner surface of the upper reflector 1. The dispersed light-distribution pattern WP has a shape indicated by the solid line protruding outward from the broken line of FIG. 6, forming a so-called drooping-eye shape.

A stepping motor is used as the drive motor 12. This stepping motor first causes a driven member (in this example, the upper reflector 1) to come into contact with a stopper in one direction, and is then stepped in the reverse direction by a prescribed number of steps to achieve a zero (reference) position setting, after which the motor is driven forward or reverse by a number of steps in accordance with information (in this example, the turning angle of the vehicle).

Guide mechanisms 13 and 14 are interposed between the upper reflector 1 and the mounting bracket 11. The guide mechanisms are formed by guide pin 13 fixed to upper reflector 1, and a guide grooves 14 provided in the shape of arcs about the upper axis V1 on the mounting bracket 11, so that the guide pin 13 is slidable in the guide groove 14.

The above-noted upper reflector 1, lower reflector 3, discharge lamp 4, drive motor 12, and guide mechanisms 13 and 14 are disposed within a lamp chamber (not shown in the drawing) delineated by a lamp housing and a front lens or front cover (not shown in the drawing), thereby forming a vehicular head lamp, which is installed at the left and right of the front of a vehicle. The lower reflector 3, along with the upper reflector 1 and lower reflector 3, is mounted into the lamp housing via an intervening left-right light-axis adjustment mechanism (not shown in the drawing) and an intervening up-down light-axis adjustment mechanism (not shown in the drawing), so as to enable adjustment of the light axis left-and-right and up-and-down.

The vehicular head lamp according to the third embodiment configured as described above is used as follows.

Figure 11:
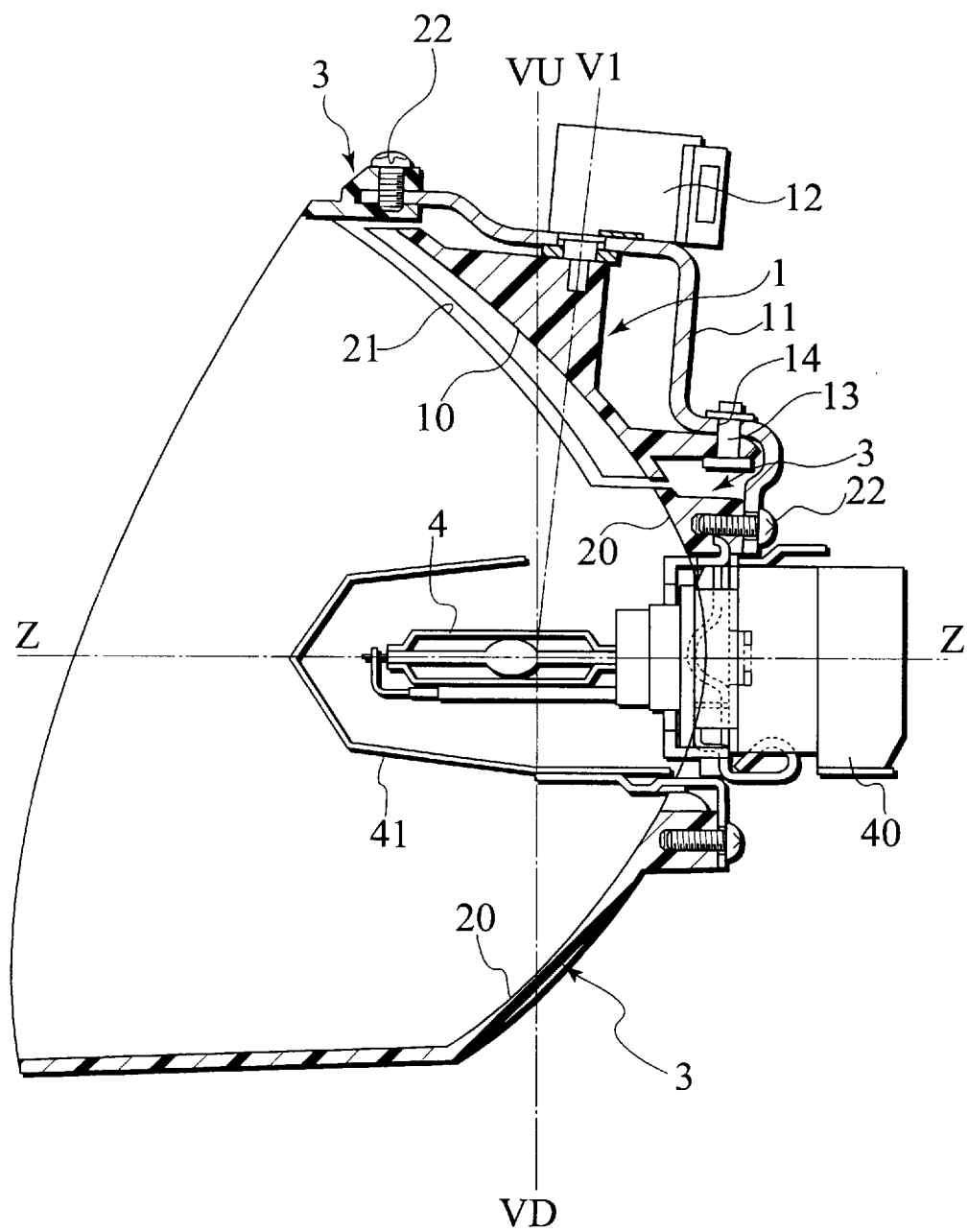
FIG. 11 is a vertical cross-sectional view of the main part (reflector) of a third embodiment for a vehicular head lamp according to the present invention, representing a cross-sectional view along the cutting line I—I of FIG. 12.
Figure 13:
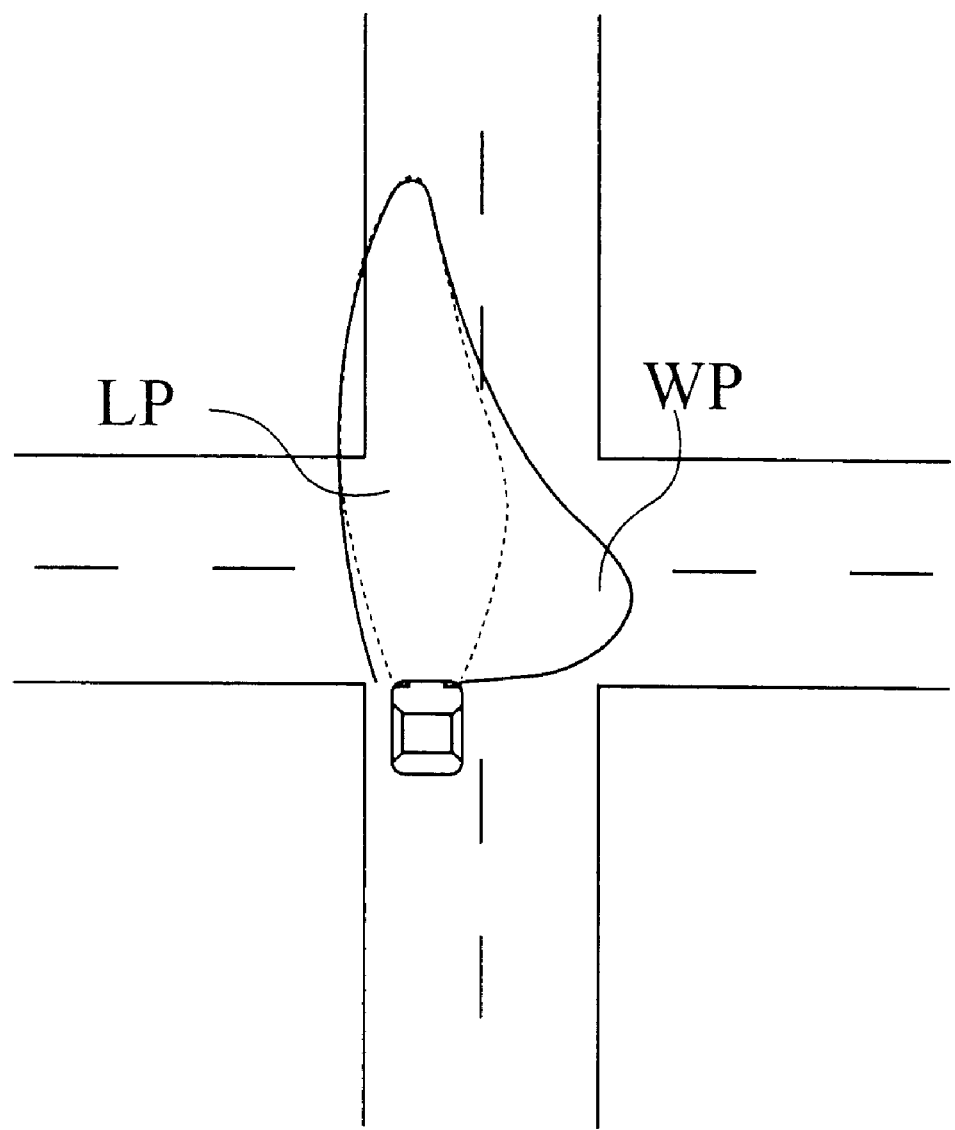
FIG. 13 is a drawing illustrating the light-distribution pattern occurring when a right turn is made at an intersection.

With the vehicle traveling in a straight line, the upper reflector 1 is at the neutral position, as shown in FIG. 3, FIG. 11, and FIG. 12. When the discharge lamp 4 is lighted, light therefrom is reflected by the reflective surface 10 of the upper reflector 1, and the reflective surface 20 of the lower reflector 3, so that a prescribed low-beam light-distribution pattern LP as shown by the solid line and partial broken line of FIG. 6 and the broken line of FIG. 13 is obtained. Under this condition, the dispersed light-distribution pattern WP is positioned within the low-beam light-distribution pattern LP.

Next, if the vehicle negotiates a right turn, the drive motor 12 is driven in accordance with information with regard to the turning angle and running speed of the vehicle, so that the upper reflector 1 is rotated through a prescribed commanded angle about the axis V1. As a result, as shown in FIG. 6 and FIG. 13, the dispersed light-distribution pattern WP is swung from the position of the low-beam light-distribution pattern LP indicated by the broken line to the position indicated by the solid line, slightly to the lower right, along the curve. In a similar manner, if a left curve is negotiated by the vehicle, the drive motor 12 is driven in accordance with information with regard to the turning angle and running speed of the vehicle so that the upper reflector 1 is rotated through a prescribed commanded angle toward the left, about the axis V1. The result is that the dispersed light-distribution pattern WP is swung slightly to the lower left of the low-beam light-distribution pattern LP along the curve.

Thus, in the third embodiment of the present invention, by causing the upper reflector 1 to rotate relative to the lower reflector 3, it is possible to change the dispersed light-distribution pattern WP with respect to the fixed reference low-beam light-distribution pattern LP.

In particular in the third embodiment, because the upper reflector 1 is rotatable about the axis V1, which is inclined toward the rear with respect to the vertical axis VU-VD, when the upper reflector 1 thereof rotates, the dispersed light-distribution pattern WP is swung to the left or to the right, so as to form a so-called drooping-eye shape, thereby illuminating the area directly in front of the running vehicle. As a result, there is an improvement in the visibility along a curve.

In the third embodiment, because the upper reflector 1 is rotatably disposed in the aperture 21 of the lower reflector 3, the area surrounding the movable upper reflector 1 is surrounded by the lower reflector 3, so that even if the upper reflector 1 is rotated, there is no change in the outer shape of the lower reflector 3. Thus, because there is no change in the outer shape of the shining reflector, the design of the light-emitting surface is not sacrificed. Furthermore, of the upper reflector 1, the location at which the lower reflector 3 is disposed is cut out, so as to form the aperture 21, so that there is no loss of rigidity of the upper reflector 1.

Additionally, in the third embodiment, because the two ends of the mounting bracket 11 are fixed to the upper and lower edges of the aperture 21 lower reflector 3, that is, because the mounting bracket 11 is supported at both ends, the rigidity (for example, torsional rigidity) of the mounting bracket 11 is great, there being a commensurate improvement in the precision of the light-distribution, and an improvement in the immunity to vibration of the vehicle.

Figure 14:
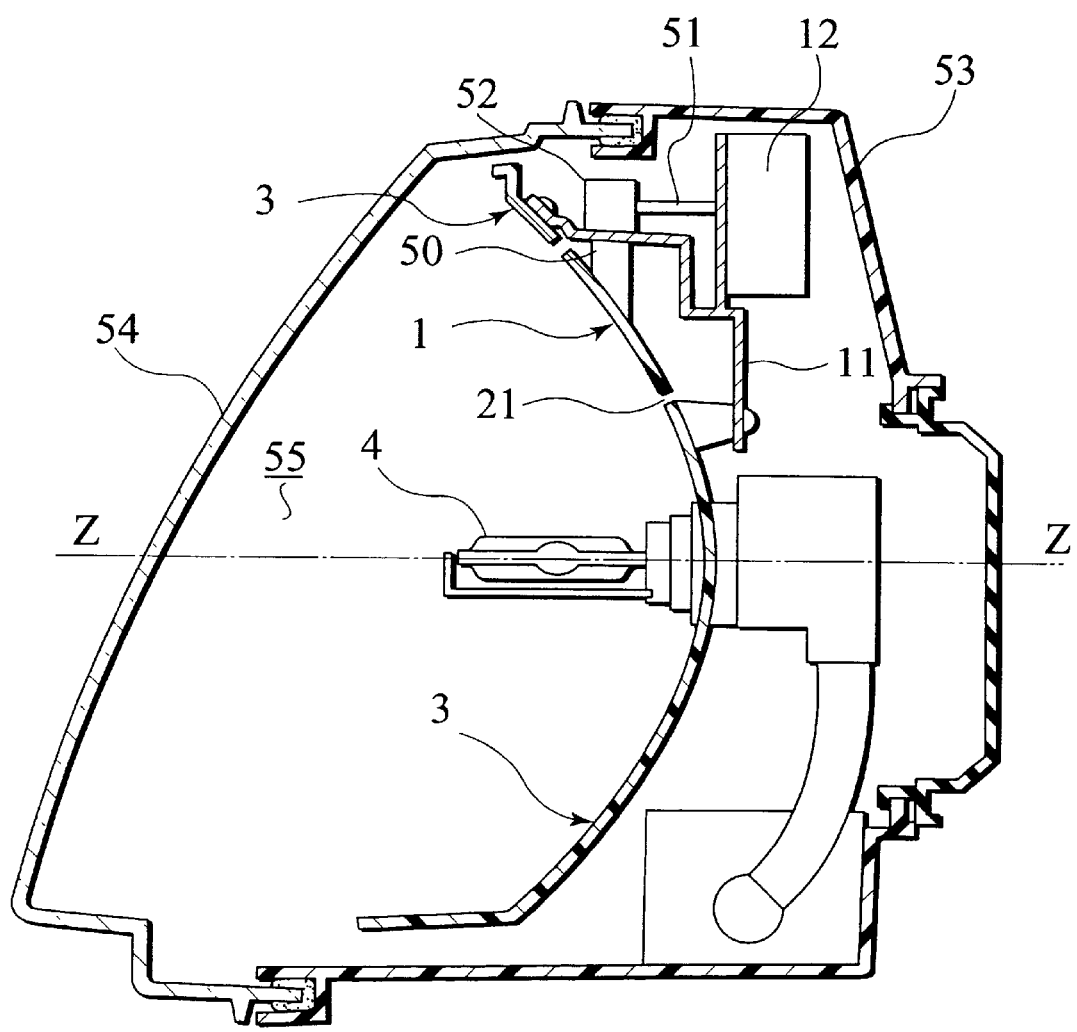
FIG. 14 is a vertical cross-sectional view showing a fourth embodiment of a vehicular head lamp according to the present invention.
Figure 15:
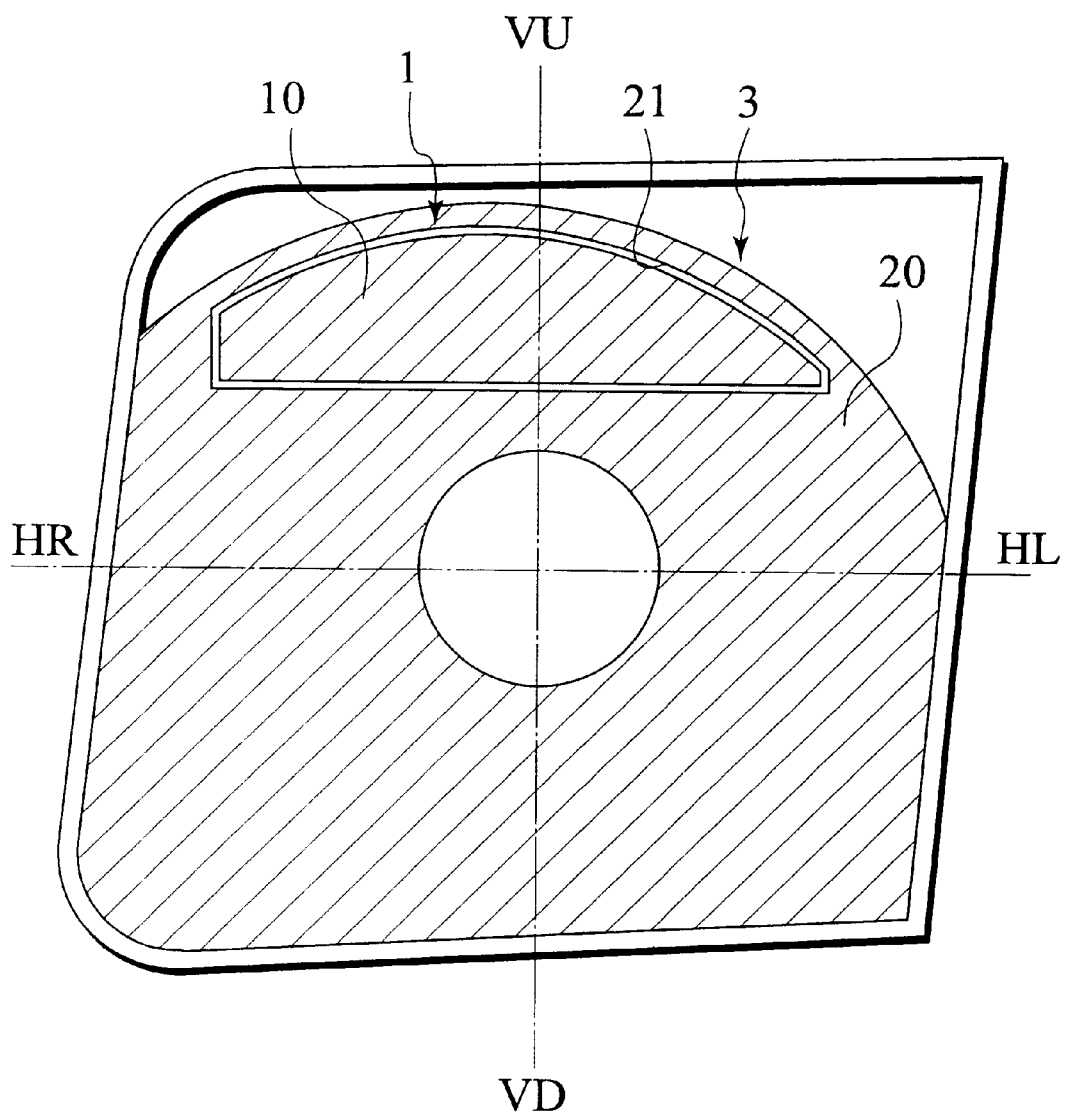
FIG. 15 is a front elevation of the reflector, showing the light-emitting surface when the upper reflector is not rotated.
Figure 16:
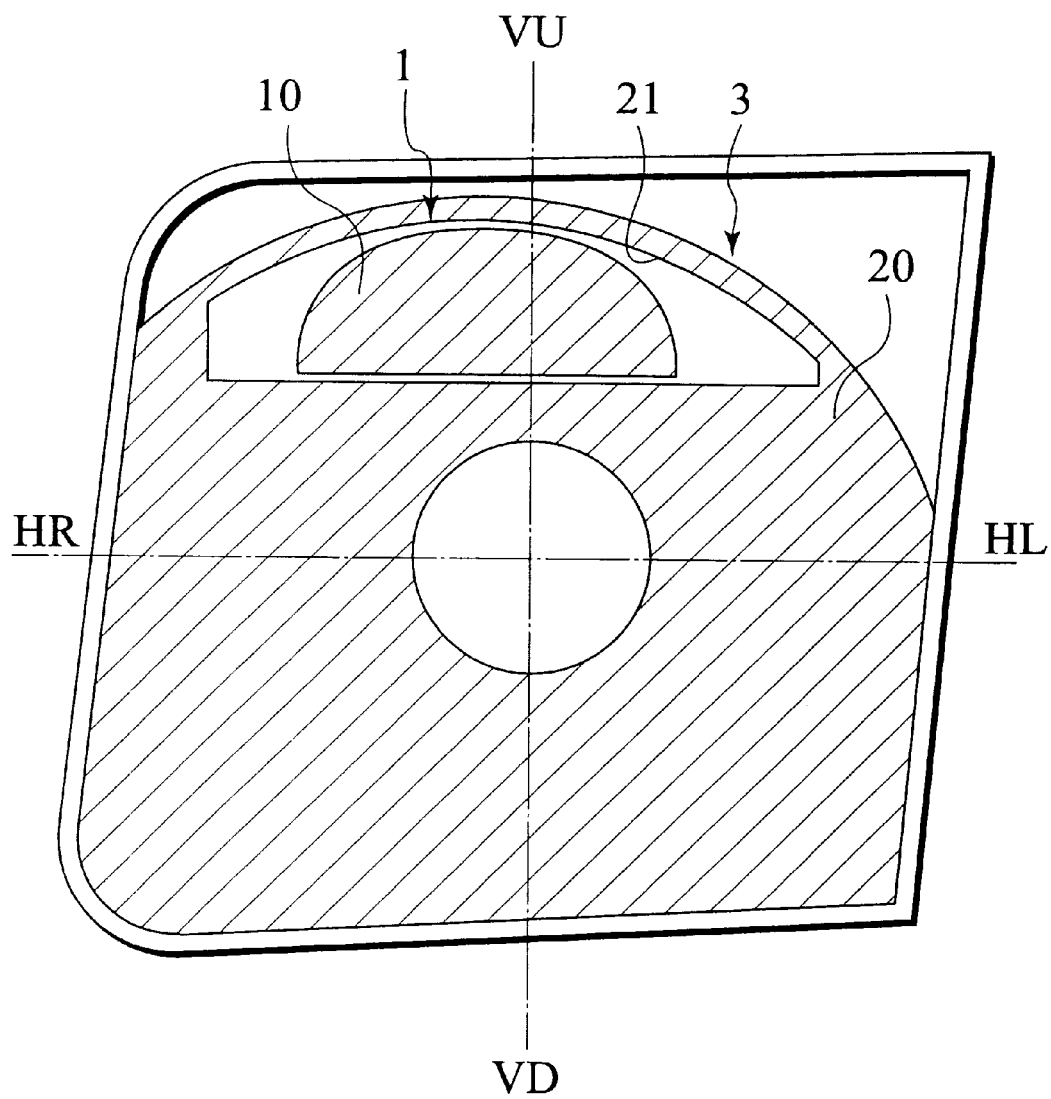
FIG. 16 is a front elevation of a reflector, showing the light-emitting surface with the upper reflector in the rotated condition.

FIG. 14 to FIG. 16 show a vehicular head lamp according to the a fourth embodiment of the present invention. Elements in these drawings that correspond to elements in FIG. 11, FIG. 12, FIG. 3, FIG. 6, and FIG. 13 are assigned the same reference numerals.

In the fourth embodiment, a rotating shaft 50 fixed vertically to the upper reflector 1 and a horizontal drive shaft 51 of the drive motor 12 are each linked to a transmission gear 52. In FIG. 14, the reference numeral 53 denotes a lamp housing, in which is provided the above-noted front lens or a front cover 54, this lamp housing 53 and the front lens or front cover 54 delineating a lamp chamber 55. The above-noted upper reflector 1, lower reflector 3, discharge lamp 4, drive motor 12, and guide mechanism 13 and 14 are disposed within this lamp chamber 55.

The fourth embodiment achieves the same type of effect as described with regard to the third embodiment. For example, because the area surrounding the movable upper reflector 1 is surrounded by the lower reflector 3, regardless of whether the upper reflector 1 is in the unrotated condition (refer to FIG. 15) or the rotated condition (FIG. 16), the outer shape of the lower reflector 3 does not change. Thus, because there is no change in the shape of the shining reflector part indicated by hatching lines in FIG. 15 and FIG. 16, the design of the light-emitting surface is not sacrificed.

Although the third and fourth embodiments are described above for the case in which area surrounding the upper reflector 1 is surrounded by the lower reflector 3, it will be understood that that it is alternately possible to have a configuration in which the upper reflector 1 is not surrounded by the lower reflector 3.

Additionally, although the third and fourth embodiments are described above for the case in which the mounting bracket His supported at both ends, a cantilever support configuration can also be adopted, and although the third and fourth embodiments have the upper reflector 1 supported at both ends by the mounting bracket 11, it is alternately possible to adopt a cantilever support configuration.

Although the third and fourth embodiments of the present invention are described above for the case in which a discharge lamp 4 is used as a light-source bulb, it will be understood that it is alternately possible to use, for example, a single-filament light-source lamp, or a double-filament light-source lamp with no light-blocking plate within the glass envelope. In this case, the reference light-distribution pattern can be either the low-beam light-distribution pattern LP or the high-beam light-distribution pattern.

As is clear from the detailed description presented above, in a vehicular head lamp according to embodiments of the present invention, the upper reflector is caused to rotate relative to the intermediate reflector, so that the dispersed light-distribution pattern is changed with respect to the fixed reference light-distribution pattern, and the lower reflector is caused to rotate with respect to the intermediate reflector, so that the collimated light-distribution pattern is changed with respect to the fixed reference light-distribution pattern, thereby resulting in an improvement in visibility along a curve.

While preferred embodiments of the present invention have been described using specific terms, such description is for illustrative purposes, and it is to be understood that changes and variations may be made without departing from the spirit or scope of the following claims.

What is claimed:

1. A vehicular head lamp comprising:
    a reflector comprising an effective reflective surface with a fixed outer shape, the effective reflective surface comprising a first reflective surface and a second reflective surface surrounded by the first reflective surface,
    wherein the second reflective surface is movable relative to the first reflective surface, and
    a light-source bulb disposed on a light axis of the first reflective surface,
    wherein the second reflective surface is rotatable about an axis passing through the light-source bulb and inclined relative to a vertical axis.

2. A vehicular head lamp according to claim 1, wherein the effective reflective surface further comprises a third reflective surface surrounded by the first reflective surface, the third reflective surface being movable relative to the first reflective surface.

3. A vehicle provided with a vehicular headlamp according to claim 2, wherein
    the reflector is divided into three parts to be an upper reflector positioned above a reference plane including the light axis and a vehicle-transversely level line, a lower reflector positioned below the reference plane, and an intermediate reflector intersecting the reference plane,
    the intermediate reflector is configured to have the first reflective surface, light from the light-source bulb reflected therefrom being provided to the vehicle as a reference light-distribution pattern,
    the upper reflector is configured to have the second reflective surface, light from the light-source bulb reflected therefrom being provided as a dispersed light-distribution pattern relative to the reference light-distribution pattern, and
    the lower reflector is configured to have the third reflective surface, light from the light-source bulb reflected therefrom being provided as a collimated light-distribution pattern relative to the reference light-distribution pattern.

4. A vehicle provided with a vehicular head lamp according to claim 3, wherein
    when a vehicle is running at a high speed, the lower reflector is controlled to be rotatable,
    when the vehicle is running at a medium speed the upper reflector and the lower reflector are controlled to be rotatable, and
    when the vehicle is running at a low speed the upper reflector is controlled to be rotatable.

5. A vehicle provided with a vehicular head lamp according to claim 3, wherein
    when a high-beam filament is lighted, the lower reflector is controlled to be rotatable, and
    when a low-beam filament is lighted, the upper reflector is controlled to be rotatable.

6. A vehicle provided with a vehicular head lamp according to claim 5, wherein
    the upper reflector is rotatable about an axis inclined toward the rear relative to a vertical axis.

7. A vehicle provided with a vehicular head lamp according to claim 3, wherein
    the upper reflector is rotatably disposed in an aperture provided at a top part above a light axis of the intermediate reflector.

8. A vehicle provided with a vehicular head lamp according to claim 3, wherein
the upper reflector is rotatable with respect to an upper mounting bracket, fixed to an upper and a lower edge of the upper aperture.

9. A vehicle provided with a vehicular head lamp according to claim 3, wherein
the lower reflector is rotatable about an axis inclined toward the front relative to a vertical axis.

10. A vehicle provided with a vehicular head lamp according to claim 3, wherein
the lower reflector is rotatably disposed in an aperture provided at a bottom part below a light axis of the intermediate reflector.

11. A vehicle provided with a vehicular head lamp according to claim 10, wherein
the lower reflector is rotatable relative to a lower mounting bracket, fixed to an upper and a lower edge of the lower aperture.

12. A vehicle provided with a vehicular head lamp according to claim 1, wherein
the reflector is divided into two parts to be an upper reflector positioned above a reference plane including the light axis and a vehicle-transversely level line, and a lower reflector intersecting the reference plane, wherein
the lower reflector is configured to have the first reflective surface, light from the light-source bulb reflected therefrom being provided to the vehicle as a reference light-distribution pattern,
the upper reflector is configured to have the second reflective surface, light from the light-source bulb reflected therefrom being provided as a dispersed light-distribution pattern relative to the reference light-distribution pattern, and
the upper reflector is pivotable about an axis inclined toward the rear relative to the vehicle.

13. A vehicle provided with a vehicular head lamp according to claim 12, wherein
the upper reflector is rotatably disposed in an aperture provided at a top part above a light axis of lower reflector.

14. A vehicle provided with a vehicular head lamp according to claim 13, wherein
the upper reflector is rotatably disposed relative to a mounting bracket, two ends of which are fixed to an upper edge and a lower edge of the aperture.

15. A vehicle having a vehicular head lamp comprising:
a reflector comprising an effective reflective surface with a fixed outer shape, the effective reflective surface comprising a first reflective surface and a second reflective surface surrounded by the first reflective surface,
wherein the second reflective surface is movable relative to the first reflective surface, and
a light-source bulb disposed on a light axis of the first reflective surface,
wherein the movable second reflective surface is disposed above the light axis and rotatable about an axis passing through the light-source bulb.

16. A vehicular head lamp comprising:
a reflector comprising an effective reflective surface with a fixed outer shape, the effective reflective surface comprising a first reflective surface and a second reflective surface surrounded by the first reflective surface,
wherein the second reflective surface is movable relative to the first reflective surface, and
a light-source bulb disposed on a light axis of the first reflective surface,
wherein the second reflective surface is rotatable about an axis inclined solely in a forward or rearward direction relative to a vertical axis.

17. A vehicular head lamp comprising:
a reflector comprising an effective reflective surface with a fixed outer shape, the effective reflective surface comprising a first reflective surface and a second reflective surface surrounded by the first reflective surface,
wherein the second reflective surface is movable relative to the first reflective surface and rotatable about a rotation axis inclined relative to a vertical axis,
a light-source bulb disposed on a light axis of the first reflective surface,
a motor for driving the second reflective surface, a drive shaft thereof rotating about the rotation axis of the second reflective surface.

\* \* \* \* \*